United States Patent [19]
Pelchat et al.

[11] 4,134,051
[45] Jan. 9, 1979

[54] BI-DIRECTIONAL ELECTRIC MOTOR CONTROL CIRCUIT

[75] Inventors: Paul F. Pelchat, Canton; Anthony March, Rochester, both of Mich.

[73] Assignee: General Motors Corporation, Detroit, Mich.

[21] Appl. No.: 831,939

[22] Filed: Sep. 9, 1977

[51] Int. Cl.² .................................... H02P 1/40
[52] U.S. Cl. ........................................ 318/282
[58] Field of Search ............... 318/257, 282, 256, 281, 318/206 R, 285, 345

[56] References Cited
U.S. PATENT DOCUMENTS

| 3,050,672 | 8/1962 | Alexanderson | 318/257 |
| 3,969,658 | 7/1976 | Htsui | 318/282 |

Primary Examiner—Herman J. Hohauser
Attorney, Agent, or Firm—Richard G. Stahr

[57] ABSTRACT

A controlled bi-directional motor is energized through a power switching arrangement of the type electrically operable in a manner to energize the motor for rotation in one direction and in another manner to energize the motor for rotation in the opposite direction. Circuitry including a single pole-single throw electrical switching device is responsive to the operation of the switching device electrically open to operate the power switching arrangment in the manner to energize the motor for rotation in a first direction and other circuitry also including the electrical switching device is responsive to the operation of the electrical switching device electrically closed to operate the power switching arrangment in the manner to energize the motor for rotation in the opposite direction.

3 Claims, 5 Drawing Figures

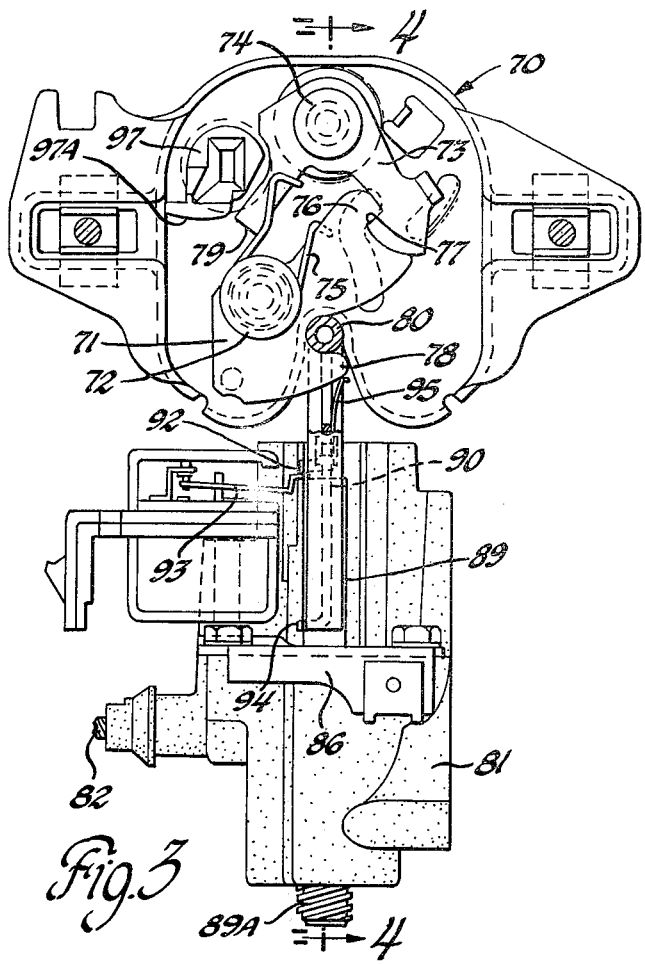
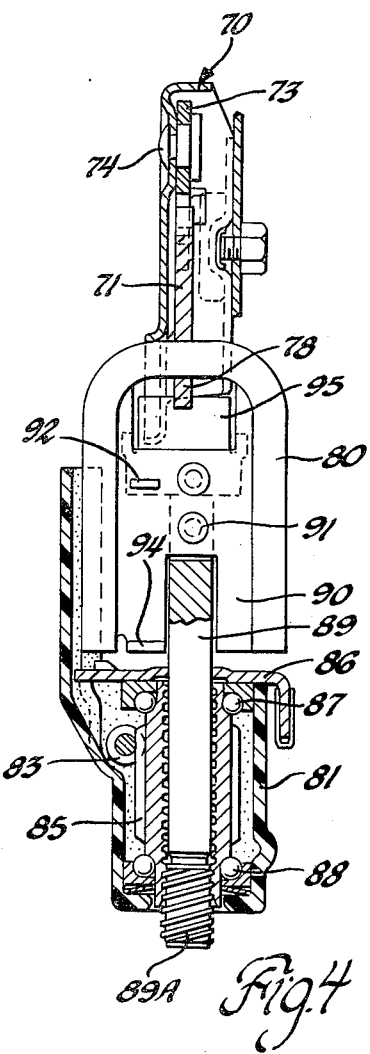
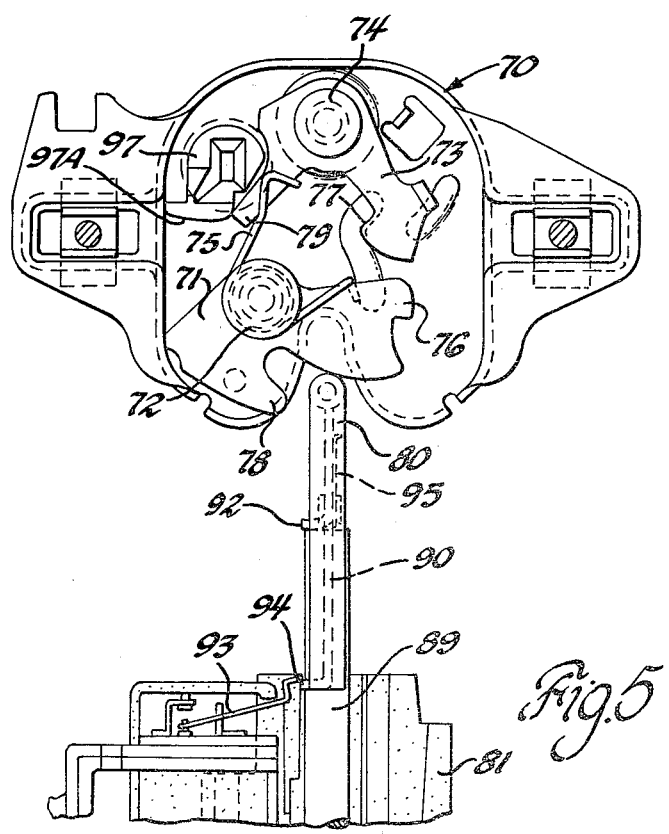

BI-DIRECTIONAL ELECTRIC MOTOR CONTROL CIRCUIT

This invention is directed to a bi-directional electric motor control circuit and, more specifically, to a control circuit of this type which is responsive to the operation of a single pole-single throw electrical switching device electrically open and electrically closed to effect controlled motor operation in respective first and second opposite directions of rotation.

It is well known in the prior art that bi-directional electric motor control may be effected through an electrical bridge circuit arrangement. Typically, operating potential is applied across one of the bridge diagonals and the controlled motor is connected across the other bridge diagonal. Switching devices in opposite legs of the circuit are triggered conductive simultaneously to provide motor energization for rotation in a first direction and other switching devices in the other opposite legs of the bridge circuit are triggered conductive simultaneously to effect motor energization for rotation in a second opposite direction. These prior art bi-directional control arrangements require at least a single pole-double throw electric switch which is operated in a first direction and in a second opposite direction to effect bi-directional motor control.

The present invention eliminates the need for a single pole-double throw electrical control switch by providing circuitry effective to energize the motor for rotation in respective opposite directions upon the operation of a single pole-single throw electrical switching device electrically open and electrically closed, respectively.

It is an object of this invention to provide an improved bi-directional electric motor control circuit.

It is another object of this invention to provide an improved bi-directional electric motor control circuit which is effective to energize the controlled motor for rotation in respective opposite directions upon the operation of a single pole-single throw electrical switching device electrically open and electrically closed.

It is an additional object of this invention to provide an improved bi-directional electric motor control circuit which effects bi-directional operation of the motor in response to the operation of a single pole-single throw electrical switching device to the electrical circuit open and electrical circuit closed conditions, respectively, and which is effective upon the operation of a movable member driven by the electric motor to either of two travel limits to interrupt motor energization and to condition the circuit for effecting the energization of the motor for rotation in the opposite direction.

In accordance with this invention, a bi-directional electric motor control circuit is provided wherein bi-directional operation of the controlled motor is effected upon the operation of a single pole-single throw electrical switching device electrically open and electrically closed, respectively, and which provides for the interruption of motor energization and the conditioning of the circuit for effecting motor energization in the opposite direction upon a movable member driven by the motor being operated to either of two travel limits.

For a better understanding of the present invention, together with additional objects, advantages and features thereof, reference is made to the following description and accompanying drawing in which:

FIG. 1 sets forth the bi-directional electric motor control of this invention in schematic form;

FIG. 3 is another plan view of the mechanism of FIG. 2;

FIG. 4 is a section view of FIG. 3 taken along line 4—4 and looking in the direction of the arrows; and FIG. 5 is another view of a portion of the mechanism of FIG. 2.

Figure 1:
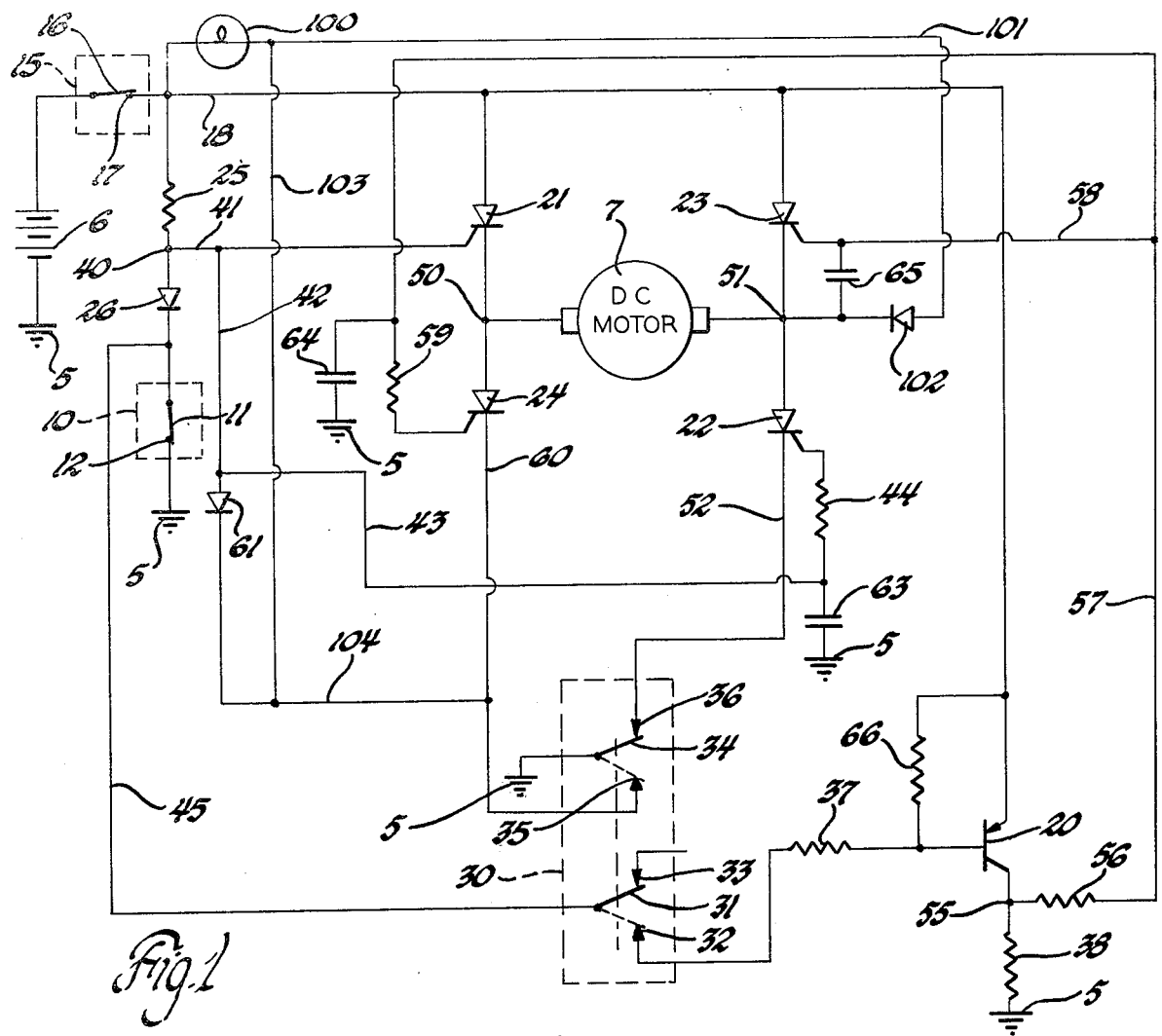

As point of reference or ground potential is the same point electrically throughout the system, it is illustrated in FIG. 1 by the accepted schematic symbol and referenced by the numeral 5.

The bi-directional electric motor control circuit of this invention may be best employed to control a bi-directional electric motor which supplies the power to drive a movable member to respective first and second travel limits, therefore, the circuit of FIG. 1 will be described in detail with regard to an application of this type.

Referring to FIG. 1 of the drawing, the bi-directional electric motor control circuit of this invention is set forth in schematic form in combination with a controlled direct current motor 7, which may be of the permanent magnet or wound field type, and a unidirectional operating potential source which may be a conventional storage battery 6. This control circuit effects the energization of controlled motor 7 for rotation in a first direction and in a second opposite direction upon the operation of a control electrical switching device electrically open and electrically closed, respectively. The control electrical switching device is illustrated in FIG. 1 as a single pole-single throw electrical switch 10 having a movable contact 11 and a stationary contact 12, however, the control electrical switching device may be any electrical switching arrangement capable of providing a single pole-single throw electrical switching function. If desirable, the output potential of battery 6 may be applied to and removed from the circuit of this invention by a conventional single pole-single throw electrical switch 15 having a movable contact 16 and a stationary contact 17. Upon the closure of movable contact 16 into electrical engagement with stationary contact 17, battery 6 potential appears across positive polarity potential lead 18 and point of reference or ground potential 5.

A power switching arrangement of the type electrically operable in a manner to energize motor 7 for rotation in one direction and in another manner to energize motor 7 for rotation in the opposite direction is provided. This power switching arrangement may include first and second electrically operable power switching device pairs, one of which, silicon controlled rectifiers 21 and 22, is effective when operated to energize motor 7 for rotation in one direction and the other of which, silicon controlled rectifiers 23 and 24, is effective when operated to energize motor 7 for rotation in the opposite direction. In a manner to be later explained, the substantially simultaneous triggering of silicon controlled rectifiers 21 and 22 conductive through the anode-cathode electrodes is effective to energize motor 7 for rotation in a first direction and the substantially simultaneous triggering of silicon controlled rectifiers 23 and 24 conductive through the anode-cathode electrodes thereof is effective to energize motor 7 for rotation in a second opposite direction.

With movable contact 16 of electrical switch 15 operated into electrical circuit closed engagement with stationary contact 17, as shown in FIG. 1, three separate electrical circuits are connected across the supply potential source, battery 6, through positive polarity potential lead 18 and closed electrical switch 15 and through point of reference or ground potential 5. One of these electrical circuits includes series connected resistor 25, diode 26 and movable contact 11 and stationary contact 12 of single pole-single throw electrical control switch 10, another includes the series combination of the emitter-base electrodes of PNP transistor 20, current limiting resistor 37, stationary contact 32 and movable contact 31 of a double pole-double throw electrical switch 30 when operated to the condition in which movable contact 31 is in electrical circuit closed relationship with stationary contact 32, and movable contact 11 and stationary contact 12 of electrical control switch 10 and a third electrical circuit includes the series combination of the emitter-collector electrodes of PNP transistor 20 and resistor 38.

Double pole-double throw electrical switch 30 may be any one of the many commercially available lever arm actuated double pole-double throw electrical switches well known in the art having the movable contacts thereof gang operated. In a manner to be explained later in this specification when a specific embodiment of the circuit of this invention is described in detail, the gang operated movable contacts 31 and 34 of double pole-double throw electrical switch 30 are arranged to be operated to the position at which they are in electrical circuit closed engagement with respective stationary contacts 33 and 36 when a movable member driven by motor 7 is at a first travel limit and to be operated to the position at which they are in electrical circuit closed engagement with respective stationary contacts 32 and 35 when the movable member driven by motor 7 is at a second travel limit. Therefore, the electrical switch including movable contact 31 and stationary contact 32 of double pole-double throw electrical switch 30 is electrically open when the movable member driven by motor 7 is at the first travel limit and is electrically closed when the movable member driven by motor 7 is at the second travel limit. In FIG. 1, gang operated movable contacts 31 and 34 of double pole-double throw electrical switch 30 are indicated to be operated to the position at which they are in electrical circuit closed engagement with respective stationary contacts 33 and 36 when the movable member driven by motor 7 is at the first travel limit.

In the following description of the operation of the circuit of this invention, it will be assumed that motor 7 is arranged to mechanically drive a mechanical movable member to first and second travel limits. Later in this specification an actual embodiment will be described.

Upon the operation of movable contact 11 of electrical control switch 10 electrically open, an electrical trigger signal of a positive polarity with respect to point of reference or ground potential 5 is present upon junction 40 between resistor 25 and diode 26. This positive polarity electrical trigger signal is applied through lead 41 to the gate electrode of silicon controlled rectifier 21 and through leads 41, 42 and 43 and resistor 44 to the gate electrode of silicon controlled rectifier 22. This positive polarity electrical trigger signal triggers silicon controlled rectifiers 21 and 22 conductive through the anode-cathode electrodes thereof to complete an energizing circuit for motor 7 for rotation in a first direction. This energizing circuit may be traced from the positive polarity terminal of battery 6, through the electrically closed contacts of switch 15, positive polarity potential lead 18, the anode-cathode electrodes of silicon controlled rectifier 21, motor 7 from junction 50 toward junction 51, the anode-cathode electrodes of silicon controlled rectifier 22, lead 52, closed electrical contacts 36 and 34 of double pole-double throw electrical switch 30 and point of reference or ground potential 5 to the negative polarity terminal of battery 6. Upon the completion of this energizing circuit, motor 7 rotates in a first direction which, for purposes of this specification, will be assumed to be in the direction to operate the movable member driven thereby toward the second travel limit. The circuit including the series combination of resistor 25, diode 26 and movable contact 11 and stationary contact 12 of electrical control switch 10, therefore, is responsive to the operation of electrical control switch 10 electrically open for producing an electrical trigger signal upon junction 40 which is effective to operate the power switching arrangement in a manner to energize motor 7 for rotation in a first direction.

When the movable member driven by motor 7 has reached the second travel limit, gang operated movable contacts 31 and 34 of double pole-double throw electrical switch 30 are operated to the position at which they are in electrical circuit closed engagement with respective stationary contacts 32 and 35, as indicated by dashed lines in FIG. 1. With gang operated movable contacts 31 and 34 operated to this position, the previously described motor 7 energizing circuit is interrupted; the circuit is conditioned for effecting the energization of motor 7 for rotation in the direction to operate the movable member toward the first travel limit and the circuitry including PNP transistor 20, resistor 38, contacts 31 and 32 of double pole-double throw electrical switch 30 and electrical control switch 10 is conditioned to be responsive to the operation of electrical control switch 10 electrically closed to produce an electrical trigger signal upon junction 55.

Upon the operation of movable contact 11 of electrical control switch 10 electrically closed, emitter-base drive current is supplied to PNP transistor 20 through a circuit which may be traced from the positive polarity terminal of battery 6, through the electrically closed contacts of switch 15, positive polarity potential lead 18, the emitter-base electrodes of PNP transistor 20, resistor 37, closed contacts 32 and 31 of double pole-double throw electrical switch 30, lead 45, closed contacts 11 and 12 of electrical control switch 10 and point of reference or ground potential 5 to the negative polarity terminal of battery 6. This drive current triggers PNP transistor 20 conductive through the emitter-collector electrodes thereof to complete a circuit for current flow through resistor 38. This circuit may be traced from the positive polarity terminal of battery 6, through electrically closed contacts of switch 15, positive polarity potential lead 18, the emitter-collector electrodes of PNP transistor 20, resistor 38 and point of reference or ground potential 5 to the negative polarity terminal of battery 6. As a result of current flow through resistor 38, an electrical trigger signal of a positive polarity with respect to point of reference or ground potential 5 is present upon junction 55. This positive polarity trigger signal is applied through resistor 56 and leads 57 and 58 to the gate electrode of silicon controlled rectifier 23 and through resistor 56, lead 57 and resistor 59 to the gate electrode of silicon controlled rectifier 24. This positive polarity electrical trigger signal triggers silicon controlled rectifiers 23 and 24 conductive through the anode-cathode electrodes thereof to complete an energizing circuit for motor 7 for rotation in a second opposite direction. This energizing circuit may be traced from the positive polarity terminal of battery 6, through the electrically closed contacts switch 15, positive polarity potential lead 18, conducting silicon controlled rectifier 23, motor 7 from junction 51 toward 50, conducting silicon controlled rectifier 24, lead 60, closed electrical contacts 34 and 35 of double pole-double throw electrical switch 30 and point of reference or ground potential 5 to the negative polarity terminal of battery 6. Upon the completion of this energizing circuit, motor 7 rotates in a second opposite direction to drive the movable member driven thereby toward the first travel limit. The circuitry including PNP transistor 20, resistor 38, contacts 31 and 32 of double pole-double throw electrical switch 30 and electrical control switch 10, therefore, is responsive to the operation of electrical control switch 10 electrically closed for producing an electrical trigger signal upon junction 55 which is effective to operate the power switching arrangement in a manner to energize motor 7 for rotation in a second direction.

When the movable member driven by motor 7 has reached the first travel limit, gang operated movable contacts 31 and 34 of double pole-double throw electrical switch 30 are operated to the position at which they are in electrical circuit closed engagement with respective stationary contacts 33 and 36. With gang operated movable contacts 31 and 34 operated to this position, the previously described motor 7 energizing circuit and the previously described circuit through which emitter-base drive current is supplied to PNP transistor 20 are interrupted and the circuit is conditioned for effecting the energization of motor 7 for rotation in the direction to operate the movable member toward the second travel limit.

From this description, it is apparent that movable contact 34 and stationary contacts 35 and 36 of double pole-double throw electrical switch 30 are effective upon a movable member driven by motor 7 being operated to either of its travel limits to interrupt the energization of motor 7 and to condition the circuit for effecting the energization of motor 7 for rotation in the direction to operate the movable member driven thereby toward the other travel limit and that movable contact 31 and stationary contact 32 of double pole-double throw electrical switch 30 are operated electrically open and closed when the movable member driven by motor 7 is at the first travel limit and at the second travel limit, respectively.

Upon the operation of movable contact 34 of double pole-double throw switch 30 into electrical circuit engagement with stationary contact 35, the gate signal present upon junction 40 is removed from silicon controlled rectifiers 21 and 22 through diode 61 and these closed contacts. Capacitors 63 and 64 introduce a slight delay in the application of the trigger signal to the gate electrode of respective silicon controlled rectifiers 22 and 24 to insure that silicon controlled rectifiers 21 and 23 are triggered on first and capacitor 65 prevents the spurious triggering of silicon controlled rectifier 23 conductive. Resistor 66 is a bias resistor for PNP transistor 20 for providing a potential upon the base electrode thereof of a positive polarity potential magnitude less than that upon the emitter electrode.

Figure 2:
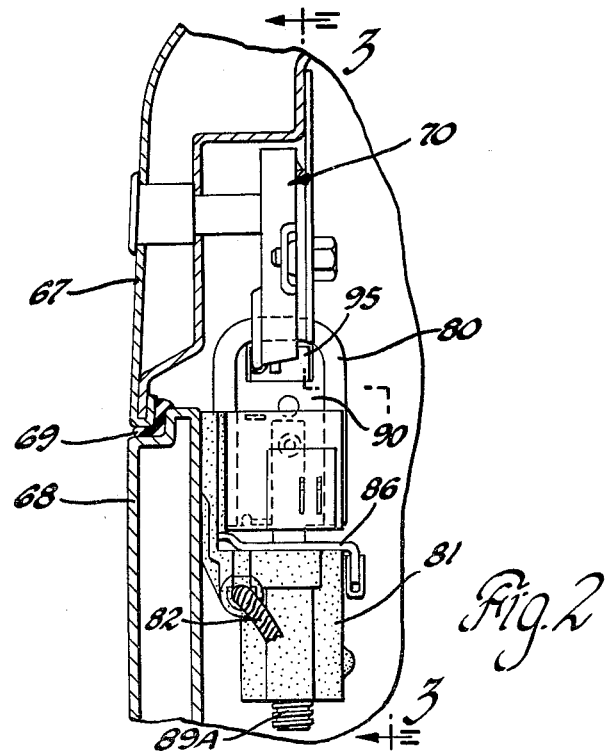
FIG. 2 is a plan view partially in cross-section of a mechanism with which the circuit of FIG. 1 may be employed.

In an actual embodiment, the circuit of FIG. 1 is employed to control a reversible direct current electric motor which operates an automobile trunk lid power pulldown mechanism. Referring to FIG. 2, a portion of each an automobile trunk lid 67 and the trunk sill 68 are shown in cross-section with the trunk lid 67 in the closed position in which it engages a rubber gasket seal 69 located between trunk lid 67 and trunk sill 68. Rigidly secured to trunk lid 67 by screws or any other suitable fastening arrangement is a trunk lid latching mechanism generally shown at 70. Referring to FIGS. 3 and 5, member 71 is arranged to pivot about pivot point 72, member 73 is arranged to pivot about pivot point 74, and both are urged to pivot in a clockwise direction, as viewing the drawing, by torsion spring 75. A pawl portion 76 of member 71 is arranged to engage the ledge or notch 77 of member 73 and a latch portion 78 of member 71 is arranged to engage in a retaining relationship the horizontal portion, as viewing the drawing, of a U-shaped striker member 80. As best seen in FIG. 3, with trunk lid 67 in the latch mode, pawl portion 76 of member 71 engages the ledge or notch 77 of member 73 and latch portion 78 of member 71 engages in a retaining relationship the horizontal portion of U-shaped striker member 80. The combination of latch portion 78 and U-shaped striker member 80, therefore, maintains trunk lid 67 in the latch mode.

In the actual embodiment, the latch portion 78 of member 71 and striker member 80 are functionally equivalent to electrical control switch 10 of FIG. 1 with striker member 80 corresponding to movable contact 11 and latch portion 78 corresponding to stationary contact 12. As the latching mechanism 70 is rigidly secured to trunk lid 67, the point of reference or ground potential 5 return circuit to the negative polarity output terminal of battery 6 is provided by the vehicle body as is well known in the automotive art. Striker member 80 is also the mechanical movable member that is mechanically operated by motor 7 to first and second travel limits as this member, in a manner to be later explained in detail, is operated by motor 7 in linear up and down directions, as viewing the drawing. In the actual embodiment, the electrical connection corresponding to lead 45 of FIG. 1 is a well known "pigtail" type electrical lead electrically connected to striker member 80 and of sufficient length to accommodate the travel distance of striker member 80.

The mechanism, to be later explained in detail, which, when driven by motor 7, drives striker member 80 between the first and second travel limits is contained within a plastic housing member 81 which electrically insulates striker member 80 from the vehicle body. As best seen in FIG. 3, the rotatable armature of motor 7 is connected to a flexible shaft 82 which is arranged to rotate a spiral worm gear 83, best seen in FIG. 4, which is arranged to engage the teeth of a spiral gear 85. Spiral gear 85 has a threaded bore, is retained in the position as shown in FIG. 4 by cap member 86 and the bottom of housing 81 and is arranged to be rotated within housing 81 on an upper ball bearing 87 and a lower ball bearing 88. A shaft member 89 is disposed within the bore of spiral gear 85 and includes a lower threaded portion 89A, the threads of which are accommodated by the threaded bore of spiral gear 85. The end of shaft member 89 opposite the threaded end 89A is secured by a rivet 91 to a web 90 rigidly secured to striker member 80. Consequently, when motor 7 revolves worm gear 83, spiral gear 85 is rotated thereby about its vertical axis, as viewing the drawing. As spiral gear 85 is retained in position by cap 86 and the bottom of housing 81, upon the rotation of this gear through worm gear 83, shaft member 89 is driven vertically upwardly and downwardly, as viewing the drawing, depending upon the direction of rotation of motor 7. As shaft member 89 is rigidly secured to web 90 which is also rigidly secured to striker member 80, striker member 80 is driven between its two travel limits with shaft member 89 to motor 7.

In FIG. 3, latch portion 78 of member 71 of latching mechanism 70 is shown to be in retaining engagement with the horizontal portion, as viewing the drawing, of U-shaped striker member 80 which is shown to be at its first travel limit. At this travel limit, trunk lid 67 is maintained tightly closed and a pawl 92 secured to web 90 engages operating arm 93 of double pole-double throw electrical switch 30 to place movable contacts 31 and 34 in electrical circuit engagement with respective stationary contacts 33 and 36. To insure a good ground connection between latch portion 78 and striker member 80, a flexible plate 95 of a conductive material is riveted to the web 90 as best seen in FIGS. 3 and 5.

To open the trunk lid 67, the lock portion, not shown, of locking mechanism 70 is rotated by a key in a manner well known in the automotive art to rotate member 97 in a counterclockwise direction, as viewing the drawing, about its axis. Upon the counterclockwise rotation of member 97, the cam portion 97A thereof engages arm 79 of member 73 to rotate member 73 in a counterclockwise direction, as viewing the drawing, about pivot point 74. The counterclockwise rotation of member 73 moves ledge or notch 77 thereof out of engagement with pawl portion 76 of member 71. Upon the disengagement of pawl portion 76 and ledge or notch 77, the force of torsion spring 75 rotates member 71 in a clockwise direction, as viewing the drawing, about pivot point 72. The clockwise rotation of member 71 moves latch portion 78 out of engagement with striker member 80, as best seen in FIG. 5, thus unlatching trunk lid 67.

The operation of latch portion 78 out of engagement with striker member 80 is functionally equivalent to operating the electrical control switch electrically open to produce an electrical trigger signal upon junction 40, FIG. 1, as previously explained. In response to this electrical trigger signal, the circuit of FIG. 1 operates in a manner previously described to effect the energization of motor 7 for rotation in the direction which will effect the operation of the shaft member 89 and striker member 80 assembly in a vertical upward direction, as viewing the drawing. When the shaft member 89 and striker member 80 assembly has traveled to the second travel limit, the highest point of vertical travel of striker member 80, another pawl 94 secured to web 90 engages operating arm 93 of double pole-double throw electrical switch. Upon this engagement of operating arm 93, the movable contacts 31 and 34 of double pole-double throw electrical switch 30 are gang operated into electrical circuit engagement with respective stationary contacts 32 and 35 to deenergize motor 7, to condition the circuit for effecting the energization of motor 7 for rotation in the direction to operate striker member 80 toward the first travel limit and to condition the circuitry including PNP transistor 20, resistor 38, contacts 31 and 32 of double pole-double throw electrical switch 30 and electrical control 10 to be responsive to the operation of electrical control switch 10 electrically closed to produce an electrical trigger signal upon junction 55.

Upon the closure of trunk lid 67, latch portion 78 engages striker member 80 in a retaining relationship which is functionally equivalent to operating the electrical control switch electrically closed to produce an electrical trigger signal upon junction 55 in a manner previously explained. In response to this electrical trigger signal, the circuit of FIG. 1 operates in a manner previously described to effect the energization of motor 7 for rotation in the direction which will effect the operation of the shaft member 89 and striker member 80 assembly in a vertical downward direction, as viewing the drawing, to pull the trunk lid 67 tightly closed against gasket 69. When the shaft member 89 and striker member 80 assembly has traveled to the first travel limit, the lowest point of vertical travel of striker member 80, pawl 92 engages operating arm 93 of double pole-double throw electrical switch 30. Upon this engagement of operating arm 93, the movable contacts 31 and 34 of double pole-double throw electrical switch 30 are gang operated into electrical circuit engagement with respective stationary contacts 33 and 36 to deenergize motor 7, to interrupt the circuit through which emitter-base drive current is supplied to PNP transistor 20 and to condition the circuit for effecting the energization of motor 7 for rotation in the direction to operate striker member 80 toward the second travel limit.

To visibly indicate that the automobile trunk lid is open, an indicating lamp 100, FIG. 1, may be mounted in the passenger compartment. When motor 7 is driving movable striker member 80 from the first travel limit toward the second travel limit, silicon controlled rectifiers 21 and 22 are conductive through the anode-cathode electrodes thereof. Consequently, an energizing circuit for indicator lamp 100 is completed which may be traced from the positive polarity output terminal of battery 6, through the closed contacts of switch 15, indicator lamp 100, lead 101, diode 102, conducting silicon controlled rectifier 22, lead 52, closed contacts 36 and 34 of double pole-double throw electrical switch 30 and point of reference or ground potential 5 to the negative polarity output terminal of battery 6. When the movable striker member 80 has been driven by motor 7 to the second level limit, the highest point of vertical travel thereof as viewing the drawing, pawl 94 engages operating arm 93 of double pole-double throw electrical switch 30. Upon this engagement of operating arm 93, the movable contacts 31 and 34 of double pole-double throw electrical switch 30 are gang operated into electrical circuit engagement with respective stationary contacts 32 and 35. At this time the energizing circuit previously described through which indicator lamp 100 is energized is interrupted. However, another energizing circuit for indicator lamp 100 is now completed from the positive polarity output terminal of battery 6, through the closed contacts of switch 15, indicator lamp 100, leads 103 and 104, closed contacts 35 and 34 of double pole-double throw electrical switch 30 and point of reference or ground potential 5 to the negative polarity output terminal of battery 6. Consequently, indicator lamp 100 is energized while trunk lid 67 is open.

When, upon the closure of trunk lid 67, movable striker member 80 has been driven by motor 7 to the first travel limit, the lowest point of vertical travel thereof as viewing the drawing, pawl 92 engaging operating arm 93 gang operates movable contacts 31 and 34 of double pole-double throw electrical switch 30 into electrical circuit engagement with respective stationary contacts 33 and 36. In this condition, both energizing circuits for indicator lamp 100 are interrupted, hence indicator lamp 100 is deenergized while trunk lid 67 is closed.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An electric motor control circuit for effecting the energization of a controlled bidirectional motor for rotation alternately in opposite directions to operate a movable member to first and second travel limits comprising in combination with a motor and an operating potential source: power switching means of the type electrically operable in a manner to energize said motor for rotation in one direction and in another manner to energize said motor for rotation in the opposite direction; a control switching device that is electrically closed when said movable member is at a first said travel limit; first circuit means including said control switching device connected across said supply potential source and responsive to the operation of said control switching device electrically open for producing an electrical signal effective to operate said power switching means in the manner to energize said motor for rotation in the direction to operate said movable member toward a second said travel limit; second circuit means including said control switching device connected across said supply potential source and responsive to the operation of said control switching device electrically closed when said movable member is at the second said travel limit for producing an electrical signal effective to operate said switching means in the manner to energize said motor for rotation in the direction to operate said movable member toward the first said travel limit; and means effective upon said movable member being operated to either of said travel limits to interrupt motor energization and to condition the circuit for effecting the energization of said motor for rotation in the direction to operate said movable member toward the other said travel limit.

2. An electric motor control circuit for effecting the energization of a controlled bidirectional motor for rotation alternately in opposite directions to operate a movable member to first and second travel limits comprising in combination with a motor and an operating potential source: first and second electrically operable power switching device pairs, one of which is effective when operated to energize said motor for rotation in one direction and the other of which is effective when operated to energize said motor for rotation in the opposite direction; a control switching device that is electrically closed when said movable member is at a first said travel limit; first circuit means including said control switching device connected across said supply potential source and responsive to the operation of said control switching device electrically open for producing an electrical signal effective to operate the said power switching device pair that is effective to energize said motor for rotation in the direction to operate said movable member toward a second said travel limit; second circuit means including said control switching device connected across said supply potential source and responsive to the operation of said control switching device electrically closed when said movable member is at the second said travel limit for producing an electrical signal effective to operate the said power switching device pair that is effective to energize said motor for rotation in the direction to operate said movable member toward the first said travel limit; and means effective upon said movable member being operated to either of said travel limits to interrupt motor energization and to condition the circuit for effecting the energization of said motor for rotation in the direction to operate said movable member toward the other said travel limit.

3. An electric motor control circuit for effecting the energization of a controlled bidirectional motor for rotation alternately in opposite directions to operate a movable member to first and second travel limits comprising in combination with a motor and an operating potential source: power switching means of the type electrically operable in a manner to energize said motor for rotation in one direction and in another manner to energize said motor for rotation in the opposite direction; a first switching device that is electrically closed when said movable member is at a first said travel limit; first circuit means including a first resistor and said first switching device connected in series across said supply potential source and responsive to the operation of said first switching device electrically open for producing an electrical signal effective to operate said power switching means in the manner to energize said motor for rotation in the direction to operate said movable member toward a second said travel limit; a transistor having two current carrying electrodes and a base electrode; second circuit means including said first switching device, a second switching device that is electrically closed when said movable member is at the second said travel limit and said base electrode and a selected one of said current carrying electrodes of said transistor connected in series across said supply potential source for supplying base drive current to said transistor upon the operation of said first switching device electrically closed; third circuit means including said current carrying electrodes of said transistor and a second resistor connected in series across said supply potential source for producing, upon the operation of said first switching device electrically closed to supply base drive current to said transistor, an electrical signal across said second resistor effective to operate said power switching means in the manner to energize said motor for rotation in the direction to operate said movable member toward the first said travel limit; and means effective upon said movable member being operated to either of said travel limits to interrupt motor energization and to condition the circuit for effecting the energization of said motor for rotation in the direction to operate said movable member toward the other said travel limit.

* * * * *